United States Patent
Aggarwal et al.

(10) Patent No.: US 7,194,540 B2
(45) Date of Patent: Mar. 20, 2007

(54) MECHANISM FOR ALLOWING MULTIPLE ENTITIES ON THE SAME HOST TO HANDLE MESSAGES OF SAME SERVICE CLASS IN A CLUSTER

(75) Inventors: Anil Aggarwal, Portland, OR (US); Oscar P. Pinto, Beaverton, OR (US); Ashok Raj, Portland, OR (US); Bruce M. Schlobohm, Fremont, CA (US); Rajesh R. Shah, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 938 days.

(21) Appl. No.: 09/965,295

(22) Filed: Sep. 28, 2001

(65) Prior Publication Data

US 2003/0065775 A1 Apr. 3, 2003

(51) Int. Cl.
*G06F 15/173* (2006.01)

(52) U.S. Cl. ............ 709/225; 709/223; 709/229; 370/389; 370/392

(58) Field of Classification Search ........ 709/240, 709/249, 250, 223, 225, 228; 719/318; 370/389, 370/392, 401
See application file for complete search history.

(56) References Cited

U.S. PATENT DOCUMENTS

| | | | |
|---|---|---|---|
| 6,438,128 B1 * | 8/2002 | Kashyap | 370/389 |
| 6,459,698 B1 * | 10/2002 | Acharya | 709/240 |
| 6,587,950 B1 | 7/2003 | Shah et al. | |
| 6,591,309 B1 | 7/2003 | Shah | |
| 6,694,361 B1 | 2/2004 | Shah et al. | |
| 6,725,386 B1 | 4/2004 | Shah | |
| 6,738,818 B1 | 5/2004 | Shah | |
| 6,757,242 B1 | 6/2004 | Wang et al. | |
| 6,760,783 B1 * | 7/2004 | Berry | 719/318 |
| 6,766,470 B1 | 7/2004 | Shah | |
| 6,772,320 B1 | 8/2004 | Raj | |
| 6,810,418 B1 * | 10/2004 | Shah et al. | 709/250 |
| 6,889,380 B1 * | 5/2005 | Shah | 719/327 |
| 6,917,987 B2 * | 7/2005 | Parthasarathy et al. | 709/249 |
| 6,988,161 B2 * | 1/2006 | McConnell et al. | 710/316 |
| 7,010,633 B2 * | 3/2006 | Arndt et al. | 709/240 |
| 2002/0133633 A1 | 9/2002 | Arvind | |
| 2003/0061367 A1 | 3/2003 | Shah | |
| 2003/0103455 A1 | 6/2003 | Pinto | |

OTHER PUBLICATIONS

Shah et al., "A Mechanism For Reporting Topology Changes To Clients In A Cluster"., U.S. Appl. No. 09/942,608., Intel Corporation.

Pinto et al., "A Mechanism For Managing Incoming Data Messages In A Cluster"., U.S. Appl. No. 09/994,779., Intel Corporation.

(Continued)

*Primary Examiner*—Abdullahi Salad
*Assistant Examiner*—Ramy M. Osman
(74) *Attorney, Agent, or Firm*—Rob D. Anderson

(57) ABSTRACT

A mechanism is provided at a host system to allow multiple entities (clients) to send and receive messages of a particular class of management services in a switched fabric for scalable solutions.

20 Claims, 5 Drawing Sheets

OTHER PUBLICATIONS

RAJ., "Method And Device For Discovering Round Trip Delays Between Nodes In An Infiniband Cluster"., U.S. Appl. No. 09/669,668., Intel Corporation.

Shah et al., "A Cluster With Multiple Paths Between Hosts And I/O Controllers"., U.S. Appl. No. 09/450,381., Intel Corporation.

Shah., "System And Method For Providing Detailed Path Information To Clients"., U.S. Appl. No. 09/694,492., Intel Corporation.

Teitenberg et al., "Method And Apparatus For Distributing Events Among Multiple Channel Drivers"., U.S. Appl. No. 09/654,069., Intel Corporation.

Shah et al., "Path Removal For Highly Connected Clusters"., U.S. Appl. No. 09/658,491., Intel Corporation.

Shah., "Method And Apparatus For Determining Multiple Instances Of The Same Type Of Service Agent"., U.S. Appl. No. 09/653,585., Intel Corporation.

Shah., "Dynamic Removal Of A Driver Stack When A Parent Driver Uses A Child Driver"., U.S. Appl. No. 09/631,873., Intel Corporation.

Shah., "Dlaying Loading Of Host-Side Drivers For Cluster Resources To Avoid Communication Failures"., U.S. Appl. No. 09/608,632., Intel Corporation.

* cited by examiner

MECHANISM FOR ALLOWING MULTIPLE ENTITIES ON THE SAME HOST TO HANDLE MESSAGES OF SAME SERVICE CLASS IN A CLUSTER

TECHNICAL FIELD

The present invention relates to data transfer interface technology in a data network, and more particularly, relates to a mechanism for allowing multiple entities on the same host to handle incoming messages of the same service class in a cluster.

BACKGROUND

As high-speed and high-performance communications become necessary for many applications such as data warehousing, decision support, mail and messaging, and transaction processing applications, a clustering technology has been adopted to provide availability and scalability for these applications. A cluster is a group of one or more host systems (e.g., computers, servers and workstations), input/output (I/O) units which contain one or more I/O controllers (e.g. SCSI adapters, network adapters etc.) and switches that are linked together by an interconnection fabric to operate as a single data network to deliver high performance, low latency, and high reliability. Clustering offers three primary benefits: scalability, availability, and manageability. Scalability is obtained by allowing servers and/or workstations to work together and to allow additional services to be added for increased processing as needed. The cluster combines the processing power of all servers within the cluster to run a single logical application (such as a database server). Availability is obtained by allowing servers to "back each other up" in the case of failure. Likewise, manageability is obtained by allowing the cluster to be utilized as a single, unified computer resource, that is, the user sees the entire cluster (rather than any individual server) as the provider of services and applications.

Emerging network technologies for linking servers, workstations and network-connected storage devices within a cluster include InfiniBand™ and its predecessor, Next Generation I/O (NGIO) which have been recently developed by Intel Corp. and other companies to provide a standard-based I/O platform that uses a channel oriented, switched fabric and separate I/O channels to meet the growing needs of I/O reliability, scalability and performance on commercial high-volume servers, as set forth in the "*Next Generation Input/Output (NGIO) Specification*," NGIO Forum on Jul. 20, 1999 and the "*InfiniBand™ Architecture Specification*," the InfiniBand™ Trade Association on Oct. 24, 2000.

One major challenge to implementing clusters based on NGIO/InfiniBand technology is to ensure that data messages traverse reliably between given ports of a data transmitter (source node) and a data receiver (destination node), via one or more given transmission (redundant) links of a switched fabric data network. Work queues formed in pairs, known as queue-pair (QP) may be utilized to process service requests (data movement operations such as message send/receive operations and remote direct memory access "RDMA" read/write operations) posted from clients to describe data movement operation and location of data to be moved for processing and/or transportation via a switched fabric data network. Each host may serve as a source (initiator) node which initiates a message data transfer (message send operation) or a target node of a message passing operation (message receive operation). One or more channels between communication devices at a host or between multiple hosts connected together directly or via a data network may be created and managed so that requested operations can be performed.

However, there may be instances where more than one entity on the same host wishes to send and receive data messages of the same fabric management class of service. Currently there is no mechanism defined in the InfiniBand™ Architecture Specification set forth on Oct. 24, 2000 to allow multiple clients to co-exist on the same host, that is, to send and receive data messages for the same fabric management service class on a particular host. As a result, multiple software such as InfiniBand™ bus driver software and InfiniBand™ subnet management software cannot co-exist efficiently on the same host since both send and receive data messages of the same fabric management service class.

Accordingly, there is a need for a more efficient mechanism to allow multiple clients to co-exist on the same host, including sending and receiving data messages for the same fabric management service class in a switched fabric data network.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein.

DETAILED DESCRIPTION

The present invention is applicable for use with all types of data networks, I/O hardware adapters and chipsets, including follow-on chip designs which link together end stations such as computers, servers, peripherals, storage subsystems, and communication devices for data communications. Examples of such data networks may include a local area network (LAN), a wide area network (WAN), a campus area network (CAN), a metropolitan area network (MAN), a global area network (GAN), a wireless personal area network (WPAN), and a system area network (SAN), including newly developed computer networks using Next Generation I/O (NGIO), Future I/O (FIO), InfiniBand™ and Server Net and those networks including channel-based, switched fabric architectures which may become available as computer technology advances to provide scalable performance. LAN systems may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on a host system including one or more hardware fabric adapters for providing physical links for channel connections in a simple data network having several example nodes (e.g., computers, servers and I/O units) interconnected by corresponding links and switches, although the scope of the present invention is not limited thereto.

Figure 1:
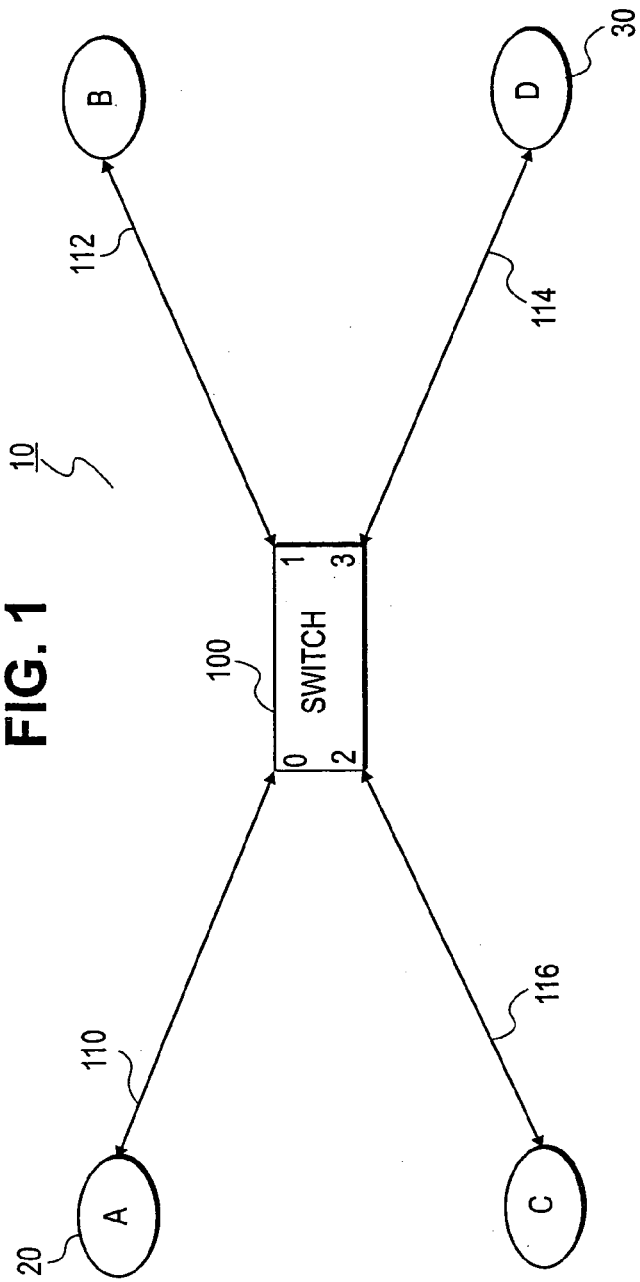
FIG. 1 illustrates a simple data network having several interconnected nodes for data communications according to an embodiment of the present invention.

Attention now is directed to the drawings and particularly to FIG. 1, in which a simple data network 10 having several interconnected nodes for data communications according to an embodiment of the present invention is illustrated. As shown in FIG. 1, the data network 10 may include, for example, one or more centralized switches 100 and four different nodes A, B, C, and D. Each node (endpoint) may correspond to one or more I/O units and host systems including computers and/or servers on which a variety of applications or services are provided. I/O unit may include one or more processors, memory, one or more I/O controllers and other local I/O resources connected thereto, and can range in complexity from a single I/O device such as a local area network (LAN) adapter to large memory rich RAID subsystem. Each I/O controller (IOC) provides an I/O service or I/O function, and may operate to control one or more I/O devices such as storage devices (e.g., hard disk drive and tape drive) locally or remotely via a local area network (LAN) or a wide area network (WAN), for example.

The centralized switch 100 may contain, for example, switch ports 0, 1, 2, and 3 each connected to a corresponding node of the four different nodes A, B, C, and D via a corresponding physical link 110, 112, 116, and 114. Each physical link may support a number of logical point-to-point channels. Each channel may be a bi-directional data path for allowing commands and data messages to flow between two connected nodes (e.g., host systems, switch/switch elements, and I/O units) within the network.

Each channel may refer to a single point-to-point connection where data may be transferred between end nodes (e.g., host systems and I/O units). The centralized switch 100 may also contain routing information using, for example, explicit routing and/or destination address routing for routing data from a source node (data transmitter) to a target node (data receiver) via corresponding link(s), and re-routing information for redundancy.

The specific number and configuration of end nodes (e.g., host systems and I/O units), switches and links shown in FIG. 1 is provided simply as an example data network. A wide variety of implementations and arrangements of a number of end nodes (e.g., host systems and I/O units), switches and links in all types of data networks may be possible.

According to an example embodiment or implementation, the end nodes (e.g., host systems and I/O units) of the example data network shown in FIG. 1 may be compatible with the "*Next Generation Input/Output (NGIO) Specification*" as set forth by the NGIO Forum on Jul. 20, 1999, and the "*InfiniBand™ Architecture Specification*" as set forth by the InfiniBand™ Trade Association on Oct. 24, 2000.

According to the NGIO/InfiniBand™ Specification, the switch 100 may be an NGIO/InfiniBand™ switched fabric (e.g., collection of links, routers, switches and/or switch elements connecting a number of host systems and I/O units), and the end node may be a host system including one or more host channel adapters (HCAs), or a remote system such as an I/O unit including one or more target channel adapters (TCAs). Both the host channel adapter (HCA) and the target channel adapter (TCA) may be broadly considered as fabric (channel) adapters provided to interface end nodes to the NGIO/InfiniBand™ switched fabric, and may be implemented in compliance with "*Next Generation I/O Link Architecture Specification: HCA Specification, Revision 1.0*", and the "*InfiniBand™ Specification*" and the "*InfiniBand™ Link Specification*" for enabling the end nodes (endpoints) to communicate to each other over an NGIO/InfiniBand™ channel(s) with minimum data transfer rates, for example, up to 2.5 gigabit per second (Gbps).

Figure 2:
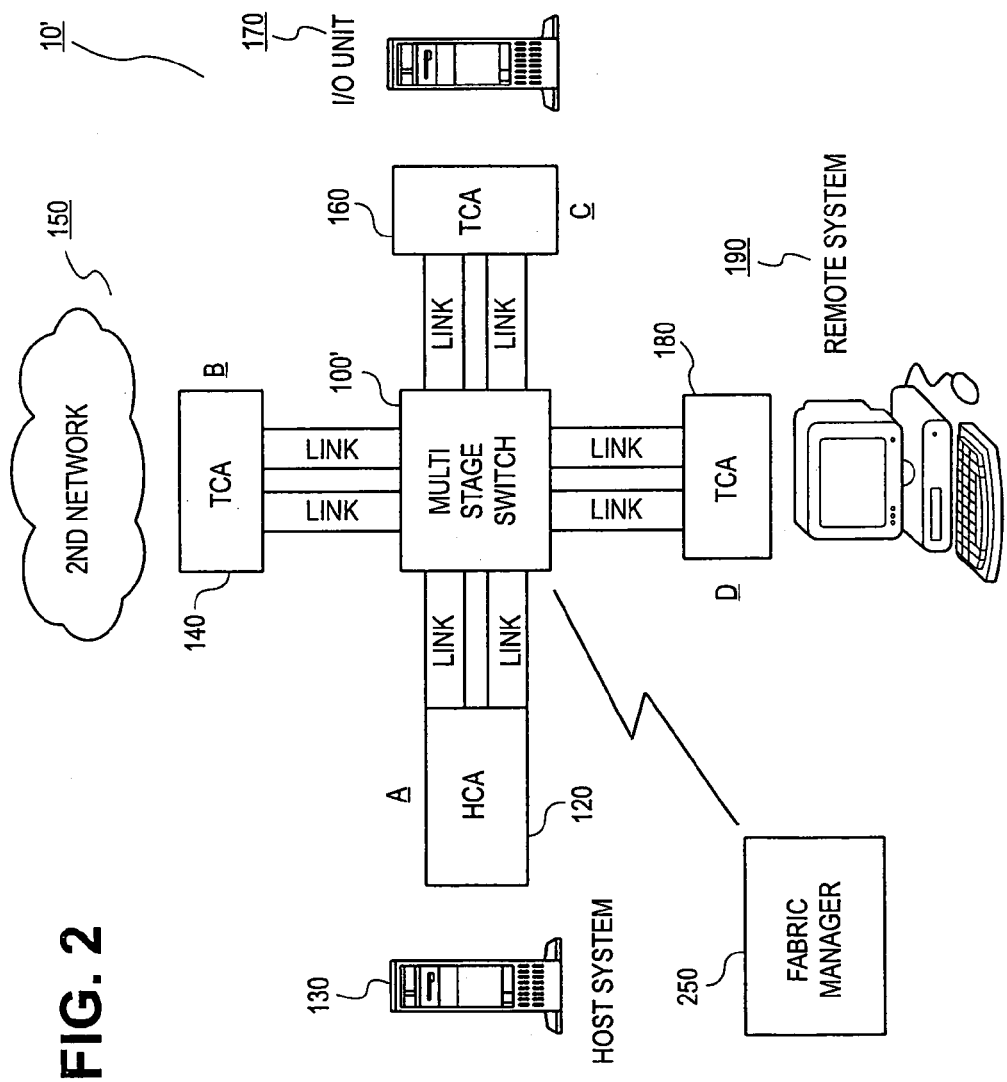
FIG. 2 illustrates another example data network having several nodes interconnected by corresponding links of a multi-stage switched fabric according to an embodiment of the present invention.

For example, FIG. 2 illustrates an example data network (i.e., system area network SAN) 10' using an NGIO/InfiniBand™ Architecture to transfer message data from a source node to a destination node according to an embodiment of the present invention. As shown in FIG. 2, the data network 10' includes an NGIO/InfiniBand™ switched fabric 100' for allowing a host system and a remote system to communicate to a large number of other host systems and remote systems over one or more designated channels. Each host system may contain work queue formed in pairs in which service (work) requests are posted to describe data transfer operations (i.e., send/receive operations and remote direct memory access "RDMA" read/write operations) and location of data to be moved for processing and/or transportation over one or more designated channels via a switched fabric 100'. A channel connection is simply an abstraction that is established over a switched fabric 100' to allow work queue pairs (QPs) at source and destination end nodes (e.g., host and remote systems, and IO units that are connected to the switched fabric 100') to communicate to each other. Each channel can support one of several different connection semantics. Physically, a channel may be bound to a hardware port of a host system. Each channel may be acknowledged or unacknowledged. Acknowledged channels may provide reliable transmission of messages and data as well as information about errors detected at the remote end of the channel. Typically, a single channel between the host system and any one of the remote systems may be sufficient but data transfer spread between adjacent ports can decrease latency and increase bandwidth. Therefore, separate channels for separate control flow and data flow may be desired. For example, one channel may be created for sending request and reply messages. A separate channel or set of channels may be created for moving data between the host system and any one of the remote systems. In addition, any number of end nodes or end stations, switches and links may be used for relaying data in groups of packets between the end stations and switches via corresponding NGIO/InfiniBand™ links. A link can be a copper cable, an optical cable, or printed circuit wiring on a backplane used to interconnect switches, routers, repeaters and channel adapters (CAs) forming the NGIO/InfiniBand™ switched fabric 100'.

For example, node A may represent a host system 130 such as a host computer or a host server on which a variety of applications or services are provided. Similarly, node B may represent another network 150, including, but may not be limited to, local area network (LAN), wide area network (WAN), Ethernet, ATM and fibre channel network, that is connected via high speed serial links. Node C may represent an I/O unit 170, including one or more I/O controllers and I/O units connected thereto. Likewise, node D may represent a remote system 190 such as a target computer or a target server on which a variety of applications or services are provided. Alternatively, nodes A, B, C, and D may also represent individual switches of the NGIO/InfiniBand™ switched fabric 100' which serve as intermediate nodes between the host system 130 and the remote systems 150, 170 and 190.

Host channel adapter (HCA) 120 may be used to provide an interface between a memory controller (not shown) of the host system 130 (e.g., servers) and a switched fabric 100' via high speed serial NGIO/InfiniBand™ links. Similarly, target channel adapters (TCA) 140 and 160 may be used to provide an interface between the multi-stage switched fabric 100' and an I/O controller (e.g., storage and networking devices) of either a second network 150 or an I/O unit 170 via high speed serial NGIO/InfiniBand™ links. Separately, another target channel adapter (TCA) 180 may be used to provide an interface between a memory controller (not shown) of the remote system 190 and the switched fabric 100' via high speed serial NGIO/InfiniBand™ links. Both the host channel adapter (HCA) and the target channel adapter (TCA) may be broadly considered as channel adapters (CAs) (also known as fabric adapters) provided to interface either the host system 130 or any one of the remote systems 150, 170 and 190 to the switched fabric 100', and may be implemented in compliance with "*Next Generation I/O Link Architecture Specification: HCA Specification, Revision* 1.0" and the "*InfiniBand™ Architecture Specification*" for enabling the end nodes (endpoints) to communicate on one or more an NGIO/InfiniBand™ link(s). Individual channel adapters (CAs) and switches may have one or more connection points known as ports for establishing one or more connection links between end nodes (e.g., host systems and I/O units).

The multi-stage switched fabric 100' may include one or more subnets interconnected by routers in which each subnet is composed of switches, routers and end nodes (such as host systems or I/O subsystems). In addition, the multi-stage switched fabric 100' may include a fabric manager 250 connected to all the switches for managing all network management functions. However, the fabric manager 250 may alternatively be incorporated as part of either the host system 130, the second network 150, the I/O unit 170, or the remote system 190 for managing all network management functions.

If the multi-stage switched fabric 100' represents a single subnet of switches, routers and end nodes (such as host systems or I/O subsystems) as shown in FIG. 2, then the fabric manager 250 may alternatively be known as a subnet manager "SM". The fabric manager 250 may reside on a port of a switch, a router, or a channel adapter (CA) of an end node and can be implemented either in hardware or software. When there are multiple subnet managers "SMs" on a subnet, one subnet manager "SM" may serve as a master SM. The remaining subnet managers "SMs" may serve as standby SMs. The master SM may be responsible for (1) learning or discovering fabric (network) topology; (2) assigning unique addresses known as Local Identifiers (LID) to all ports that are connected to the subnet; (3) establishing all possible data paths among end nodes, via switch forwarding tables (forwarding database); and (4) detecting and managing faults or link failures in the network and performing other network management functions. However, NGIO/InfiniBand™ is merely one example embodiment or implementation of the present invention, and the invention is not limited thereto. Rather, the present invention may be applicable to a wide variety of any number of data networks, hosts and I/O units using industry specifications. For example, practice of the invention may also be made with Future Input/Output (FIO). FIO specifications have not yet been released, owing to subsequent merger agreement of NGIO and FIO factions combine efforts on InfiniBand™ Architecture specifications as set forth by the InfiniBand Trade Association (formed Aug. 27, 1999) having an Internet address of "http://www.InfiniBandta.org."

Figure 3:
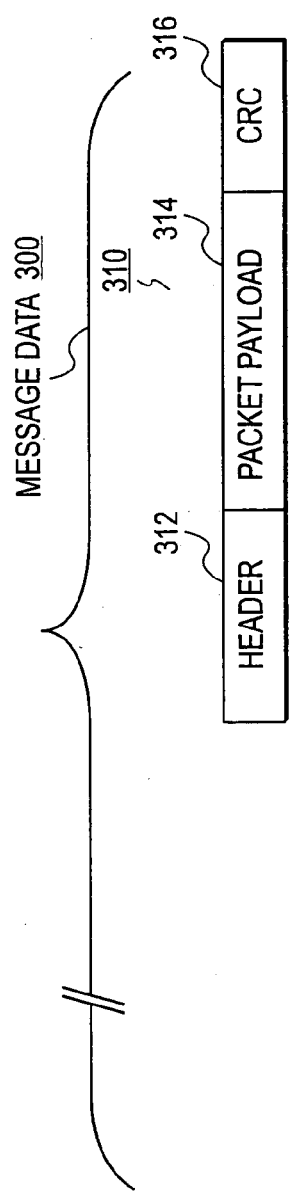
FIG. 3 illustrates an example packet of data messages transmitted from a source node (data transmitter) to a destination node (data receiver) in an example data network according to an embodiment of the present invention.

FIG. 3 illustrates an example packet format of message data transmitted from a source node (data transmitter) to a destination node (data receiver) through switches and/or intermediate nodes in an example IBA subnet according to the "*InfiniBand™ Architecture Specification*" as set forth by the InfiniBand™ Trade Association on Oct. 24, 2000. As shown in FIG. 3, a message data 300 may represent a sequence of one or more data packets 310 (typically derived from data transfer size defined by a work request). Each packet 310 may include header information 312, variable format packet payload 314 and cyclic redundancy check (CRC) information 316. Under the "*Next Generation Input/Output (NGIO) Specification*" as previously set forth by the NGIO Forum on Jul. 20, 1999, the same data packets may be referred to as data cells having similar header information as the least common denominator (LCD) of message data. However, NGIO header information may be less inclusive than InfiniBand™ header information. Nevertheless, for purposes of this disclosure, data packets are described herein below via InfiniBand™ protocols but are also interchangeable with data cells via NGIO protocols.

The header information 312 according to the InfiniBand™ specification may include, for example, a local routing header, a global routing header, a base transport header and extended transport headers each of which contains functions as specified pursuant to the "*InfiniBand™ Architecture Specification*". For example, the local routing header may contain fields such as a destination local identifier (LID) field used to identify the destination port and data path in the data network 10', and a source local identifier (LID) field used to identify the source port (injection point) used for local routing by switches within the example data network 10' shown in FIG. 2.

Figure 4:
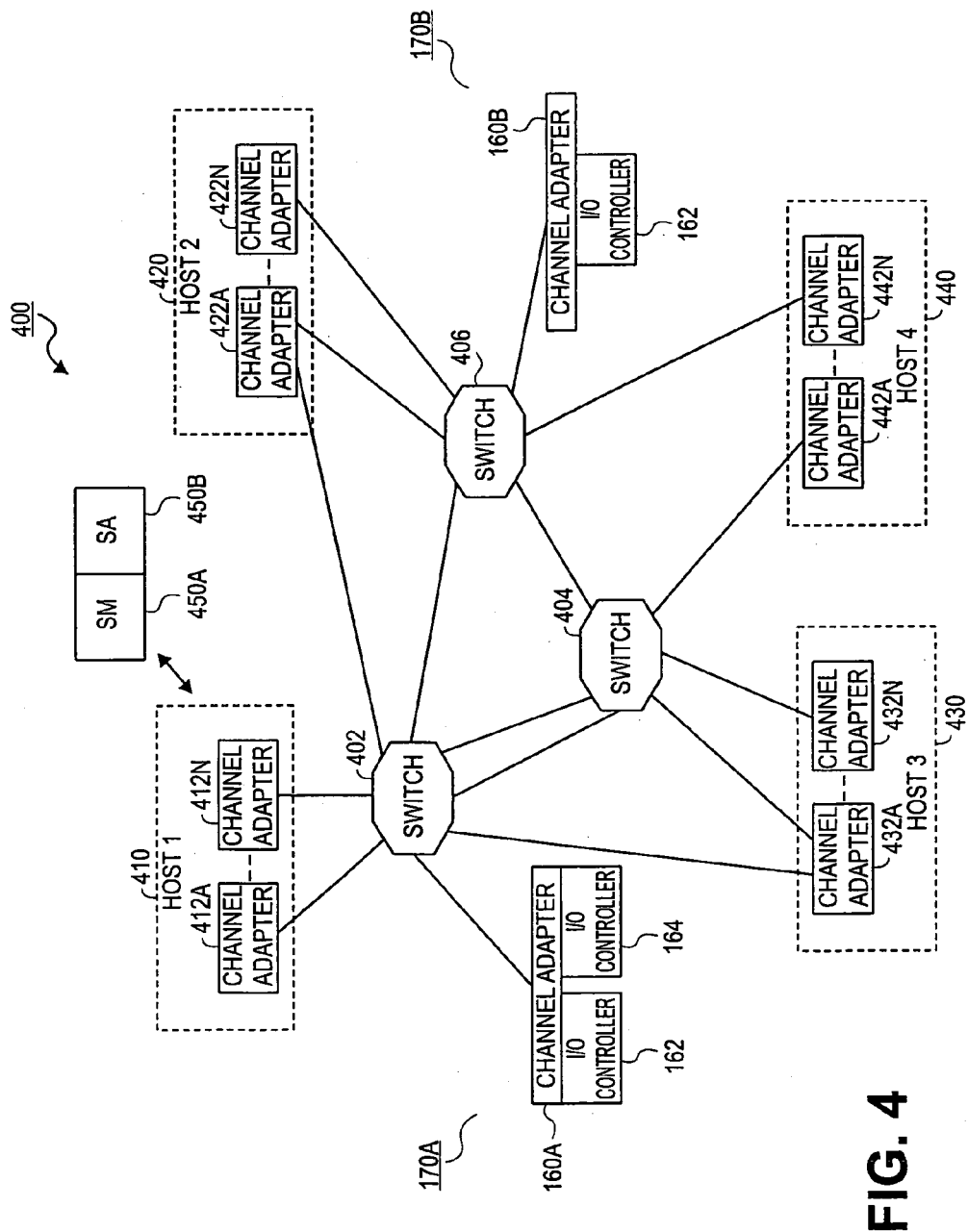
FIG. 4 illustrates an example InfiniBand™ Architecture (IBA) subnet including switches and channel adapters installed, for example, at respective host system and remote system according to an embodiment of the present invention.

FIG. 4 illustrates an example InfiniBand™ Architecture (IBA) subnet in an InfiniBand™ cluster including, for example, four (4) host systems including a plurality of channel adapters (CAs) 410, 420, 430 and 440, three (3) switches 402, 404 and 406, and two I/O enclosures 170A–170B with channel adapters (CAs) 160A–160B according to an embodiment of the present invention. Each of the host systems 410, 420, 430 and 440 and the I/O enclosures 170A–170B may serve as an individual service provider or an individual InfiniBand™ client requesting services from the service provider in a client/server model, for example. One or more channel adapters (CAs) may be installed at each host system 410, 420, 430 and 440.

The IBA subnet 400 may also include a collection of switch (S1) 402, switch (S2) 404, and switch (S3) 406 arranged to establish connection between the host systems 410, 420, 430 and 440, via respective channel adapters (CAs) 412A–412N, 422A–422N, 432A–432N and 442–442N and I/O enclosures 160A–160B, via respective channel adapters (CAs) 160A–160B. Each switch as well as the channel adapter (CA) may have one or more connection points called "ports" provided to establish connection with every other switch and channel adapter (CA) in an example IBA subnet 400 via one or more link.

Typically IBA management services may be provided by a local subnet manager "SM" 450A and a local subnet administrator "SA" 450B. The subnet manager "SM" 450A and the subnet administrator "SA" 450B may substitute the fabric manager 250 shown in FIG. 2, and can be implemented either in hardware or software module (i.e., an application program) installed to provide IBA management services for all switches and end nodes in the IBA subnet 400. For example, if the subnet manager "SM" 450A is implemented in software, a subnet management software module may be written using high-level programming languages such as C, C++ and Visual Basic, and may be provided on a computer tangible medium, such as memory devices; magnetic disks (fixed, floppy, and removable); other magnetic media such as magnetic tapes; optical media such as CD-ROM disks, or via Internet downloads, which may be available for a human subnet (fabric) administrator to conveniently plug-in or download into an existing operating system (OS). Alternatively, the software module may also be bundled with the existing operating system (OS) which may be activated by a particular device driver for performing all network management functions in compliance with the InfiniBand™ Architecture specification.

In one embodiment of the present invention, both the subnet manager "SM" 450A and the subnet administrator "SA" 450B may be installed at any one of the host systems 410, 420, 430 and 440 for managing all subnet management functions. However, the subnet manager "SM" 450A and the subnet administrator "SA" 450B may also be installed as part of any individual end node and switch within the IBA subnet 400.

The IBA management services may be broadly classified into subnet services and general services. At a minimum the subnet services, offered by the subnet manager "SM" 450A, include basic initialization such as discovering fabric topology, assigning unique addresses called Local Identifiers (LID) to all ports that are connected to the IBA subnet 400, programming switch forwarding tables (also known as routing table) and maintaining general functioning of the IBA subnet 400. Most of the data collected during discovery and used to configure the IBA subnet 400 may be assimilated by the subnet administrator "SA" 450B for a subnet administration service to provide access to information such as data paths and alternate data paths between end nodes, topology change notifications and notification of events, including error detection, and recovery procedures.

General services may include, for example, a communication management service which provides the means to set up and manage communications between a pair of queue pairs (QP) or, in certain cases, to identify which queue pair (QP) to use for a certain service; a performance management service which specifies a set of facilities for examining various performance characteristics of the IBA subnet 400 (or switched fabric 100'); a device management service which specifies the means for determining the type and location of various types of fabric-attached devices such as I/O controllers; a device configuration service which assigns fabric-attached devices such as I/O controllers to hosts; a baseboard management service which allows management of fabric-attached devices beyond a channel adapter (CA); and a network protocol service which specifies mechanisms to support transport of protocol operations such as Simple Network Management Protocol "SNMP" operations through the IBA subnet 400 (or switched fabric 100').

In addition, particular cluster implementations may also need and contain proprietary services to perform cluster-specific functions. For example, specific cluster implementations may contain a Name Service that maps host system names to InfiniBand™ information such as Local Identifiers (LIDs), Global Identifiers (GIDs), Globally Unique Identifiers (GUIDs) etc.

Each of these IBA management services may be implemented as logically independent entities, referred to as managers and agents, and interfaces. Managers may be conceptual functional entities that effect control over IBA fabric-attached devices (or elements) or provide for gathering information from IBA fabric-attached devices. In general, managers may reside anywhere in the IBA subnet 400 (switched fabric 100'). Similarly, agents may be conceptual functional entities present in IBA channel adapters (CAs), switches, and routers that process management messages arriving at the port of the IBA channel adapters (CAs), switches, and routers where they exist. Interfaces may represent a target (for example, queue pairs "QPs") to which messages may be sent and through which messages will be processed or will be dispatched to an appropriate processing entity. Management operations may be divided into a set of management service classes. For a given class of activity, there is usually only a small number of managers on an IBA subnet 400. Conceptually, of reach supported service class, there may be one agent on each switch, channel adapter (CA), and router on the IBA subnet 400.

Communication between managers and agents may be performed through management messages referred to as Management Datagrams (MADs). Management Datagrams (MADs) are the basic elements of the message scheme defined for management communications. MADs may be classified into predefined management classes and for each MAD there may be a specified format, use, and behavior.

According to the InfiniBand™ Architecture specification, all MADs may consist of a common MAD header and MAD data. MAD header may include information such as Management Class, Class Version, Status and TransactionID.

In addition, the IBA management services including the subnet services and the general services may also be assigned by Management Datagram classes (MAD classes). For example, the subnet administration service may be assigned MAD class 3, the device management service may be assigned MAD class 6, SNMP service may be assigned MAD class 8 etc.

For each service, there are typically service managers, called Class Managers for the MAD class and service agents, called Class Agents for the MAD class. Class agents and class managers communicate with each other using messages of the MAD class assigned to that service. These messages are typically directed at a specific well known queue-pair (QP) called the General Services Interface (GSI) QP. GSI QP may be numbered QP1 on all ports on all channel adapters (CAs). This message may be received by the General Services Agent (GSA), which handles all incoming and outgoing messages on the GSI QP. Since the GSI QP exists on all ports on all channel adapters (CAs), the GSA also exists on all ports on all channel adapters (CAs). A class manager or agent registers itself with the GSA running on that host. As part of the registration, the class manager or agent provides its MAD class to the GSA. When a message comes in on the GSI QP from the wire, the GSA inspects the MAD class of the incoming message. If an entity has registered itself with the GSA for that MAD class, the incoming message may be forwarded to that entity. If no entity has registered for that MAD class, the incoming message may be discarded.

There may be instances where more than one entity wishes to send and receive messages of a particular MAD class on the same host (or I/O enclosure). However, the InfiniBand™ Architecture specification does not define any procedure that can be used to allow multiple GSA clients to send/receive incoming messages of the same MAD class on the same host. In the absence of such a mechanism, multiple class agents or a class manager and one or more class agent of the same MAD class cannot operate on the same host.

Figure 5:
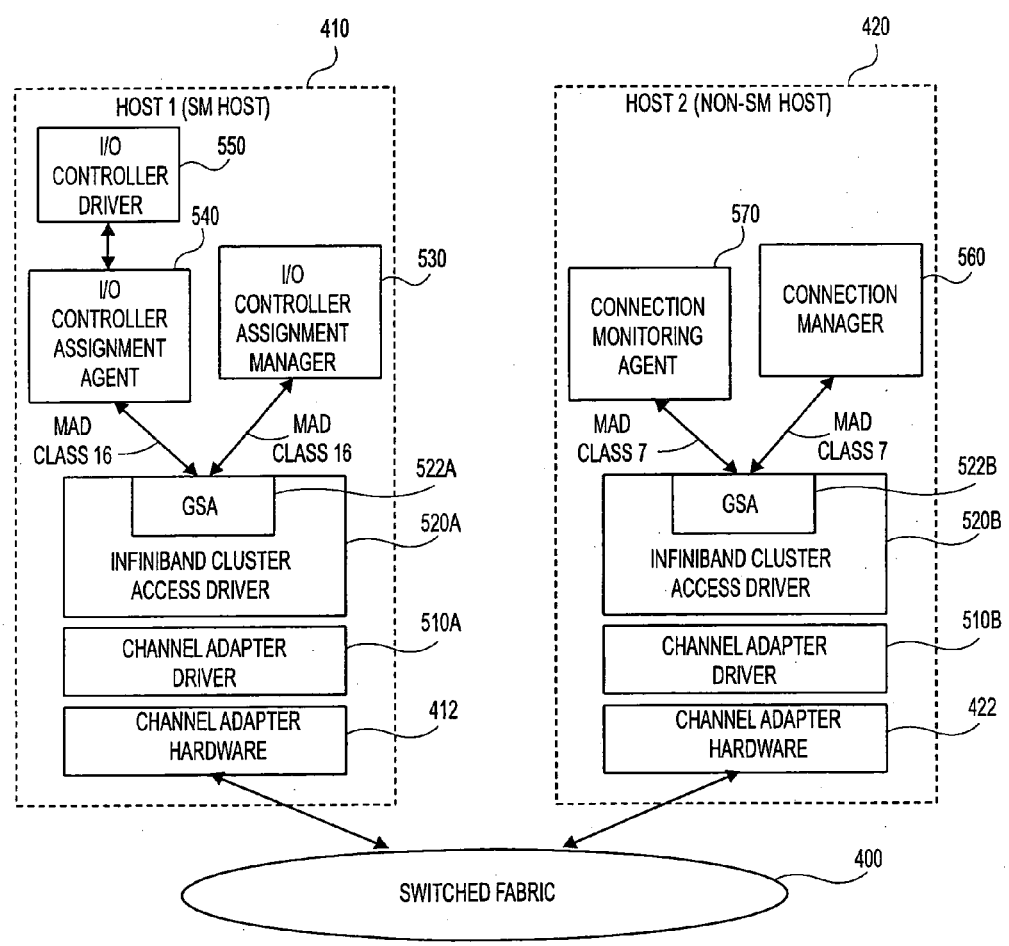
FIG. 5 illustrates an example of multiple entities in a host registering for the same fabric management service class according to an embodiment of the present invention.

For example, FIG. 5 illustrates an example in which multiple entities wish to send and receive messages of the same MAD class on the same host, for example, host #1 410 and host #2 420. Host #1 410 and host #2 420, for example, are attached to the IBA switched fabric 400 as described with reference to FIG. 4. Host #1 410 may serve as a subnet manager (SM) host, and host #2 420 may serve as a normal host, i.e., a non-subnet manager (SM) host. However, both host #1 410 and host #2 420 may include software and hardware necessary for supporting data transfer, via the IBA switched fabric 400.

As shown in FIG. 5, for example, SM host #1 410 may include a channel adapter (CA) hardware 412, a CA driver 510A, an InfiniBand™ cluster access driver 520A including a General Services Agent (GSA) 522A, an I/O controller assignment agent 540 and an I/O controller driver 550, and subnet management software, such as an I/O controller assignment manager 530.

Non-SM host #2 420 may include a channel adapter (CA) hardware 422, a CA driver 510B, an InfiniBand™ cluster access driver 520B including a General Services Agent (GSA) 522B, a connection manager 560 and a connection monitoring agent 570.

In host #1 410, the I/O controller assignment manager 530 may be used to assign fabric-attached controllers to hosts on the switched fabric 400. In addition, the I/O controller assignment agent 540 may be used to accept I/O controller assignments and communicate with the I/O controller assignment manager 530 to coordinate the loading and unloading of device drivers for the I/O controllers assigned to that particular host. In this situation, two logically distinct entities (e.g., I/O controller assignment manager 530 and I/O controller assignment agent 540) on the same host #1 410 need to send/receive messages of the same MAD class.

In host #2 420, the connection manager 560 may be used to set up connections between InfiniBand™ agents running on host #2 420 and other InfiniBand™ agents running elsewhere (every other host in the IBA subnet 400). The connection monitoring agent 570 may be used to monitor connections made between host #2 420 and any other fabric-connected entity. In this example, two logically distinct entities on the same host #2 420 need to send/receive messages of MAD class 7, for example, as shown in FIG. 5.

In both host #1 410 and host #2 420, the General Services Agent (GSA) 522A–522B residing therein may handle all incoming and outgoing messages, via the switched fabric 400. Such GSA may also refer to the group of all supported general service agent installed on a channel adapter (CA), switch, or router.

As described previously, the InfiniBand™ Architecture specification defines the General Services Agent (GSA) 522A–522B, for example, but does not define any mechanism that can be used to allow multiple GSA clients to send/receive messages of the same MAD class on the same host. In the absence of such a mechanism, the host #1 410 or host #2 420 cannot contain multiple class agents or a class manager and one or more class agent of the same MAD class.

As a result, a new procedure for allowing multiple entities to send and receive messages of the same MAD class on a particular host is described according to an embodiment of the present invention. The procedure used to allow multiple entities to send and receive messages of the same MAD class on a particular host is lightweight for the GSA clients and does not change normal processing model to handle incoming messages. In addition, proprietary mechanisms are not needed between multiple entities wanting to send and receive messages of the same MAD class.

According to an embodiment of the present invention, the procedure used to allow multiple entities to send and receive messages of the same MAD class on a particular host may be implemented in software (algorithm) installed in the particular host, and written using high-level programming languages such as C, C++ and Visual Basic, and may be provided on a computer tangible medium, such as memory devices; magnetic disks (fixed, floppy, and removable); other magnetic media such as magnetic tapes; optical media such as CD-ROM disks, or via Internet downloads, which may be available for a human subnet (fabric) administrator to conveniently plug-in or download into an existing operating system (OS). Alternatively, the software module may also be bundled with the existing operating system (OS) which may be activated by a particular device driver for performing all network management functions in compliance with the InfiniBand™ Architecture specification.

The present invention prescribes the following behaviors for the GSA to support the capability:

1) Registration for a MAD class: The GSA 522A–522B of host #1 410 and host #2 420 (or any other host in the IBA subnet 400) should allow multiple entities to register for the same MAD class. The GSA may maintains a list of clients registered for each MAD class. Each client that registers for a MAD class may be given a ClientID. This client ID may be created by the GSA and returned to the client at the time of registration with the GSA. Each time a client makes a request to the GSA (e.g. to send a message), it is required to provide its ClientID as part of the request. This implies that a client needs to register and obtain a valid ClientID before it can use the GSA in any way. According to an embodiment of the present invention, the ClientID may be assumed to be 8 bits wide though different implementations can chose to keep the client ID width from 8 bits to 64 bits.

2) Distinguishing "promiscuous" clients from "non-promiscuous" clients: At the time of registration, the GSA should allow and require the client (entity) to specify whether it wants to operate in "promiscuous" or "non-promiscuous" mode. According to an embodiment of the present invention, a "promiscuous" client may be defined as one that wants to be delivered all incoming messages that correspond to the MAD class that it registered for. In contrast, a "non-promiscuous" client may be defined as one that only wants messages that are specifically targeted for it (e.g. reply messages that are sent by a remote agent in response to a request message that this client had previously sent out). An example of a promiscuous client may be a class manager for a MAD class, since the class manager wants to be given response messages as well as fresh incoming requests from remote clients.

3) Handling message sends: Each time the GSA sends a message on behalf of a client, the GSA should "tag" the outgoing message with the ClientID of the client that requested GSA to send the message. The way it does that is by using the TransactionID field in the MAD common header that exists in all MADs. As per the InfiniBand™ Architecture specification, TransactionID is a 64-bit field in the MAD common header that is supposed to be set by whoever originated the message on the IBA switched fabric.

This means that the GSA client supplies a 64-bit TransactionID to the GSA when it requests the GSA to send a message. The GSA replaces 8 bits from the input TransactionID with the ClientID of the requesting client and sends the message out. Note that the purpose of embedding ClientID in the TransactionID of the outgoing message is not to allow the receiver of the message to identify the sender of the message. Rather, the purpose is to identify the original sender of the message when the receiver of the message sends a response message back to the sender.

4) Replying to incoming messages: Each time a GSA client sends a reply message in response to an incoming request message from a remote entity, the GSA client may copy the TransactionID of the original request message as the TransactionID in the response message as required by the InfiniBand™ Architecture specification. By copying the input TransactionID to the output TransactionID, the responder has ensured that the ClientID embedded in the incoming TransactionID is sent back as part of the response message.

5) Handling message receives from the wire: The following special procedure the GSA should follow to process an incoming message coming in from the IBA switched fabric 400. The most difficult aspect of supporting multiple clients for the same MAD class on the same host is matching incoming messages from the wire to the correct recipient. Therefore, incoming messages may be classified into two categories and may define a procedure to handle each type of incoming message:

a) Incoming messages that are reply messages to request messages that were previously sent out from the host: According to an embodiment of the present invention, such messages may be called "response messages". If an incoming message is a response message, the GSA knows that the incoming TransactionID must contain the embedded ClientID of the client that originally sent the message. In this situation, the GSA may extract the ClientID from the TransactionID. The GSA may then check to see if that client is still registered for that MAD class. If the client is still registered for that MAD class, the incoming response message may be delivered to the client (entity). If the client is not registered for that MAD class, the message may be discarded.

b) Incoming messages that are not responses to previously sent messages: According to an embodiment of the present invention, these messages may be called "unsolicited incoming messages". When an unsolicited incoming message arrives at the GSA, the GSA may deliver the unsolicited incoming message to all clients that registered themselves as "promiscuous" clients. If any of these clients return an indicator to the GSA that the incoming message has been processed completely, the GSA does not deliver the message to any of the non-promiscuous clients. If all promiscuous clients return a status indicating they did not process the message completely, the GSA may deliver the incoming message to the first non-promiscuous client in the list of clients registered for that MAD class. This continues till a non-promiscuous client returns a status indicating it has processed the message completely, after which no further forwarding of the message takes place.

It should be noted that response messages may be easily distinguished from unsolicited incoming messages. As per the InfiniBand™ Architecture specification, a response message must always contain the "Response" bit set in the MAD common header while an unsolicited incoming message must never have the "Response" bit set in the MAD common header. Since the MAD common header must exist in all MADs, the GSA can always reliably determine if an incoming message is a response message or an unsolicited incoming message.

Figure 6:
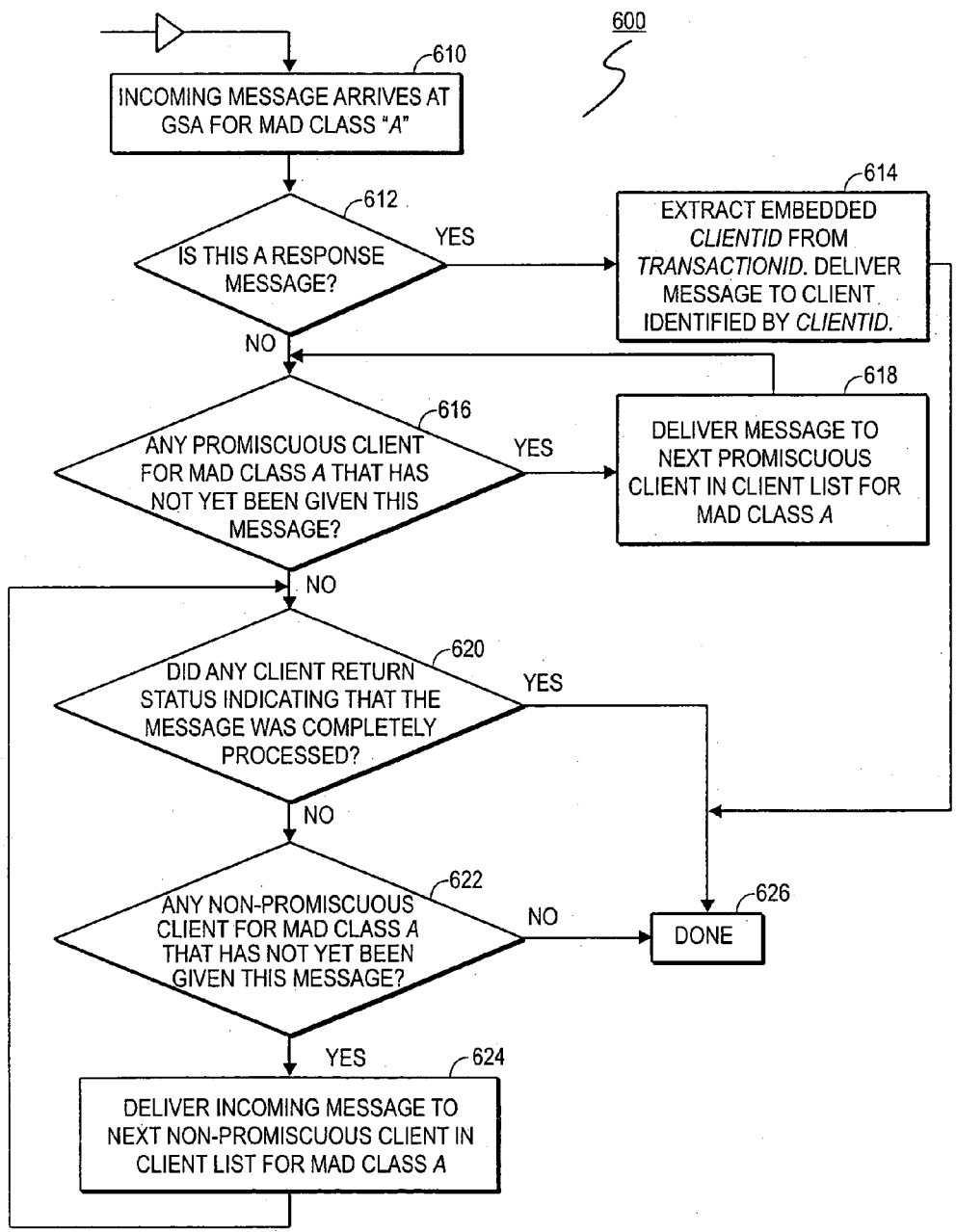
FIG. 6 illustrates an example high-level message handling procedure to process an incoming message received from an example switched fabric according to an embodiment of the present invention.

Turning now to FIG. 6, an algorithm implemented by the GSA of a host (for example, host #1 410 or host #2 420) to process incoming messages from the IBA switched fabric 400 according to an embodiment of the present invention is illustrated. As shown in FIG. 6, when an incoming message is received at the General Services Agent (GSA) at host #1 410 or host #2 420 for a particular management service class, for example, designated MAD class "A" (wherein "A" corresponds to any class of services described previously) at block 610, the GSA determines if the incoming message is a response message at block 612. If the incoming message is determined as a response message, then the GSA extracts an embedded ClientID from the TransactionID field of the incoming message and delivers the message to a client (entity) identified by the ClientID at block 614.

If the incoming message is not a response message, the GSA may acknowledge that the incoming message is an unsolicited incoming message. This is because a response message may always contain the "Response" bit set in the MAD common header while an unsolicited incoming message may never contain the "Response" bit set in the MAD common header. The GSA may then deliver the unsolicited incoming message to all clients (entities) that registered as "promiscuous" clients. Specifically, the GSA determines if any "promiscuous" client for the particular management service class, i.e., MAD class "A" that has not yet been given the message at block 616. If any "promiscuous" client for the particular management service class, i.e., MAD class "A" that has not yet been given the message, the GSA delivers the message to a next "promiscuous" client in a list of clients registered for that MAD class at block 618. The GSA continues to deliver the message until all "promiscuous" clients in the list of clients registered for that MAD class "A" have been given the message.

Next the GSA determines if any of these "promiscuous" clients (entities) returns an indicator back to the GSA indicating that the message has been processed completely at block 620. If the "promiscuous" client returns an indicator back to the GSA indicating that the message has been processed completely, then the algorithm 600 may be completed at block 626.

If none of the "promiscuous" clients returns an indicator back to the GSA indicating that the message has been processed completely, then the GSA determines if there is any non-promiscuous client for that particular management service class, MAD class "A" that has not yet been given the message at block 622. If there is none of the non-promiscuous clients for MAD class "A" that has not yet been given the message, the algorithm 600 may be completed at block 626.

However, if there is any "non-promiscuous" client for that particular management service class, MAD class "A" that has not yet been given the message, the GSA delivers the incoming message to a next non-promiscuous client in the list of clients registered for that MAD class "A" at block 624 and returns to block 620 to process until there is none of the non-promiscuous clients for MAD class "A" that has not yet been given the message.

It should be noted that several variations may be possible to the procedure described with reference to FIG. 6. For example, in block 612 shown in FIG. 6, the GSA may not want to allow any random client to mark itself as a promiscuous client. The GSA may allow only one promiscuous client for each MAD class and this client may be the class manager of the MAD class. Alternatively, the GSA may allow class agents (i.e. non-class managers) to be promiscuous clients also but only after performing some additional security or authentication checks. The GSA may choose to treat kernel mode GSA clients separately from user-mode clients. Another type of variation is that in block 614 shown in FIG. 6, the GSA may not blindly replace 8 bits from TransactionID with ClientID. Rather the GSA may internally store TransactionID supplied by the client and replace the same with its own TransactionID in the outgoing message before sending the message out. When a corresponding incoming response message arrives, the GSA may restore the client supplied TransactionID previously saved before passing the message up to the client. In this situation, the GSA client can use the full 64 bits of the TransactionID without having to sacrifice 8 bits for ClientID. As a result, the GSA procedure of embedding ClientID in the TransactionID may be invisible to GSA clients.

As described from the foregoing, the present invention advantageously provides a mechanism that allows multiple clients (entities) to send and receive messages for the same management service class (MAD class) on a particular host. Otherwise, InfiniBand™ software on a subnet management host may not be executed properly. For example, an InfiniBand™ bus driver on the same host as the InfiniBand™ subnet management software may not be executed since both the InfiniBand™ bus driver and subnet management software send and receive messages of the same MAD class. Since the InfiniBand™ bus driver causes the loading and unloading of I/O device drivers for fabric-attached I/O devices, this essentially disallows the host running the subnet manager software from using any fabric-attached I/O devices. As a result of the procedure as described with reference to FIGS. 5–6, both the InfiniBand™ bus driver and the InfiniBand™ subnet management software may co-exist on the same host, for example, host #1 410 or host #2 420 shown in FIG. 5, and may be executed more efficiently and seamlessly in a way that was not possible according to existing InfiniBand™ Architecture specification. Another advantage of the procedure as described with reference to FIGS. 5–6 of the present invention is that a solution for the problem of handling unsolicited incoming messages as needed is provided to support distributing InfiniBand events to class agents running on the same host as the class manager. Event support is important for designing scalable solutions. Another feature of this solution is that it fits in the regular GSA model very cleanly and does not require changes in GSA clients. All the complexity is hidden in the GSA and implemented just once rather than forcing each GSA client to incorporate additional complexity to support this capability. This makes the code for GSA clients less complex and less error prone and simplifies the task of writing GSA clients. As a result, InfiniBand clusters are more usable, client friendly and less wastefully congested. These properties assist in achieving the end result of a functional and high performance cluster and promote the use of clusters based on NGIO/InfiniBand™ technology.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the data network as shown in FIGS. 1–4 may be configured differently or employ some or different components than those illustrated. Such a data network may include a local area network (LAN), a wide area network (WAN), a campus area network (CAN), a metropolitan area network (MAN), a global area network (GAN) and a system area network (SAN), including newly developed computer networks using Next Generation I/O (NGIO) and Future I/O (FIO) and Server Net and those networks which may become available as computer technology advances in the future. LAN system may include Ethernet, FDDI (Fiber Distributed Data Interface) Token Ring LAN, Asynchronous Transfer Mode (ATM) LAN, Fiber Channel, and Wireless LAN. However, the mechanism shown in FIGS. 5–6 for allowing multiple entities to handle messages of the same management service class in those clusters may need to be adjusted accordingly. In addition, the subnet manager "SM" and the subnet administrator "SA" may be integrated and installed at any node of the IBA subnet. The algorithm shown in FIG. 6 may be configured differently or employ some or different components than those illustrated without changing the basic function of the invention. In addition, storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks. Many modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A method for enabling multiple entities to send and receive messages of a designated class of management services on a particular host, via a switched fabric, comprising the steps of:
   determining an incoming message for a designated class of management services received from a switched fabric;
   if the incoming message is an unsolicited incoming message, delivering the unsolicited incoming message to all entities that registered as "promiscuous" clients for the designated class of management services;
   determining if all "promiscuous" clients indicate that the unsolicited incoming message has not been processed; and
   if all "promiscuous" clients indicate that the unsolicited incoming message has not been processed, delivering the unsolicited incoming message to an entity that registered as a "non-promiscuous" client for the designated class of management services until a "non-promiscuous" client indicates that the unsolicited incoming message has been processed.

2. The method as claimed in claim 1, wherein the "promiscuous" clients are entities registered for receiving all incoming messages that correspond to the designated class of management services, and the "non-promiscuous" client is an entity registered for receiving only messages that are specifically targeted for said entity.

3. The method as claimed in claim 2, wherein the designated class of management services indicates a Management Datagram (MAD) class assigned to a specific management service in accordance with the "*InfiniBand™ Architecture Specification*".

4. The method as claimed in claim 3, wherein the specific management service indicates one of a subnet administration service which provides data path information to reach fabric-attached devices; a communication management service which provides the means to set up and manage communications between queue pairs; a performance management service which specifies a set of facilities for examining various performance characteristics of the switched fabric; a device management service which specifies the means for determining the type and location of various types of fabric-attached devices; a device configuration service which assigns fabric-attached devices to the particular host; a baseboard management service which allows management of the fabric-attached devices; and a network protocol service which specifies mechanisms to support transport of Simple Network Management Protocol "SNMP" operations through the switched fabric.

5. The method as claimed in claim 3, wherein, when the incoming message is determined as a response message to previously sent messages from the particular host, a ClientID is extracted from a message header and the response message is delivered to an entity identified by the ClientID, if the entity is registered for the designated class of management services.

6. The method as claimed in claim 5, wherein the incoming message is determined as an unsolicited incoming message when the incoming message does not contain a "response" bit set in a message header, or a response message when the incoming message contains a "response" bit set in the message header.

7. The method as claimed in claim 3, wherein all entities are required to register for the designated class of management services to obtain respective valid ClientID prior to enabling multiple entities to send and receive messages of the designated class of management services on the particular host.

8. A host system comprising:
at least one channel adapter (CA) including one or more ports to support data transfers, via a switched fabric; and
an access driver module including a general service agent (GSA) to enable multiple entities to send and receive messages of a designated class of management services on the host system, via the switched fabric;
wherein the general service agent (GSA) is configured to perform:
determining an incoming message for a designated class of management services received from the switched fabric;
if the incoming message is an unsolicited incoming message, delivering the unsolicited incoming message to all entities that registered at the general service agent (GSA) as "promiscuous" clients for the designated class of management services;
determining if all "promiscuous" clients indicate that the unsolicited incoming message has not been processed; and
if all "promiscuous" clients indicate that the unsolicited incoming message has not been processed, delivering the unsolicited incoming message to an entity that registered at the general service agent (GSA) as a "non-promiscuous" client for the designated class of management services until a "non-promiscuous" client indicates that the unsolicited incoming message has been processed.

9. The host system as claimed in claim 8, wherein the "promiscuous" clients are entities registered at the general service agent (GSA) for receiving all incoming messages that correspond to the designated class of management services, and the "non-promiscuous" client is an entity registered at the general service agent (GSA) for receiving only messages that are specifically targeted for said entity.

10. The host system as claimed in claim 9, wherein the designated class of management services indicates a Management Datagram (MAD) class assigned to a specific management service in accordance with the "*InfiniBand™ Architecture Specification*".

11. The host system as claimed in claim 10, wherein the specific management service indicates one of a subnet administration service which provides data path information to reach fabric-attached devices; a communication management service which provides the means to set up and manage communications between queue pairs; a performance management service which specifies a set of facilities for examining various performance characteristics of the switched fabric; a device management service which specifies the means for determining the type and location of various types of fabric-attached devices; a device configuration service which assigns fabric-attached devices to the host system; a baseboard management service which allows management of the fabric-attached devices; and a network protocol service which specifies mechanisms to support transport of Simple Network Management Protocol "SNMP" operations through the switched fabric.

12. The host system as claimed in claim 10, wherein, when the incoming message is determined as a response message to previously sent messages from the host system, the general service agent (GSA) extracts a ClientID from a message header and delivers the response message to an entity identified by the ClientID, if the entity is registered at the general service agent (GSA) for the designated class of management services.

13. The host system as claimed in claim 12, wherein the general service agent (GSA) determines the incoming message as an unsolicited incoming message when the incoming message does not contain a "response" bit set in a message header, or a response message when the incoming message contains a "response" bit set in the message header.

14. The host system as claimed in claim 13, wherein all entities are required to register with the general service agent (GSA) for the designated class of management services to obtain respective valid ClientID prior to enabling multiple entities to send and receive messages of the designated class of management services on the host system.

15. A computer readable medium comprising instructions that, when executed by a host system in a switched fabric including end nodes and switches interconnected via links, cause the host system to allow multiple entities to send and receive messages of a designated class of management services on the host system by:
determining an incoming message for a designated class of management services received from the switched fabric;
if the incoming message is an unsolicited incoming message, delivering the unsolicited incoming message to all entities that registered as "promiscuous" clients for the designated class of management services;
determining if all "promiscuous" clients indicate that the unsolicited incoming message has not been processed; and
if all "promiscuous" clients indicate that the unsolicited incoming message has not been processed, delivering the unsolicited incoming message to an entity that registered as a "non-promiscuous" client for the designated class of management services until a "non-promiscuous" client indicates that the unsolicited incoming message has been processed.

16. The computer readable medium as claimed in claim 15, wherein the "promiscuous" clients are entities registered for receiving all incoming messages that correspond to the designated class of management services, and the "non-promiscuous" client is an entity registered for receiving only messages that are specifically targeted for said entity.

17. The computer readable medium as claimed in claim 16, wherein the designated class of management services indicates a Management Datagram (MAD) class assigned to a specific management service in accordance with the "InfiniBand™ Architecture Specification".

18. The computer readable medium as claimed in claim 16, wherein, when the incoming message is determined as a response message to previously sent messages from the host system, a ClientID is extracted from a message header and the response message is delivered to an entity identified by the ClientID, if the entity is registered for the designated class of management services.

19. The computer readable medium as claimed in claim 18, wherein the incoming message is determined as an unsolicited incoming message when the incoming message does not contain a "response" bit set in a message header, or a response message when the incoming message contains a "response" bit set in the message header.

20. The computer readable medium as claimed in claim 16, wherein all entities are required to register for the designated class of management services to obtain respective valid ClientID prior to enabling multiple entities to send and receive messages of the designated class of management service on the host system.

* * * * *